United States Patent [19]

Lauzier

[11] 4,163,482

[45] Aug. 7, 1979

[54] CENTER-PULL CALLIPER BRAKES FOR BICYCLES AND THE LIKE

[75] Inventor: René Lauzier, Ruy, France

[73] Assignee: Angenieux CLB S.A., St. Etienne, France

[21] Appl. No.: 882,053

[22] Filed: Feb. 28, 1978

[30] Foreign Application Priority Data

Mar. 14, 1977 [FR] France .................... 77 08322

[51] Int. Cl.$^2$ .................................................. B62L 1/06
[52] U.S. Cl. ................................... 188/24; 188/72.2
[58] Field of Search ........................... 188/24, 72.2

[56] References Cited

U.S. PATENT DOCUMENTS 3,809,187  5/1974  Grieve ........................... 188/24

FOREIGN PATENT DOCUMENTS 897819  6/1944  France ........................... 188/24
898521  7/1944  France ........................... 188/72.2

Primary Examiner—Duane A. Reger
Attorney, Agent, or Firm—Browdy and Neimark

[57] ABSTRACT

The invention provides a center-pull calliper brake for a bicycle or the like in which the callipers are hinged about respective axes which are inclined with respect to the median plane of the wheel rim in such a way as to diverge when considered along the direction of movement of the wheel during forward travel of the vehicle. This gives a self-applying braking effect which considerably increases the safety of the bicycle.

3 Claims, 6 Drawing Figures

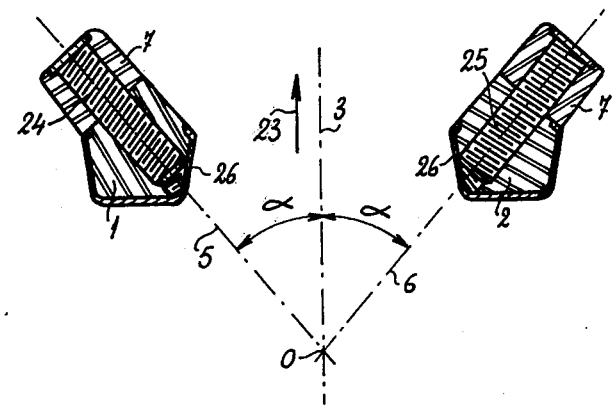
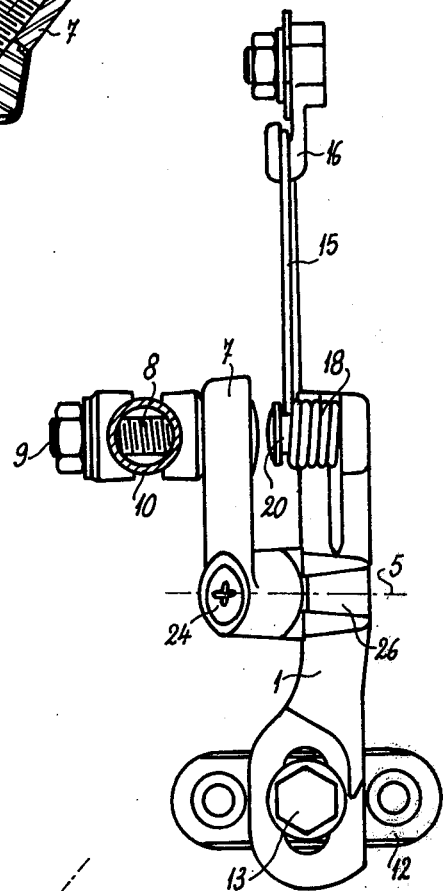
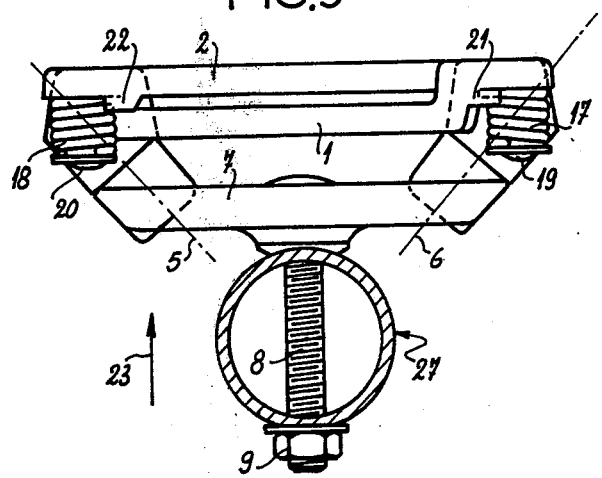

CENTER-PULL CALLIPER BRAKES FOR BICYCLES AND THE LIKE

The present invention relates to a vehicle, such as a bicycle having a centre-pull calliper brake.

Bicycle wheel brakes in current use can be classed in three categories: side-pull brakes, centre-pull brakes and disc-brakes. In a side-pull brake, the two callipers which carry the brake shoes are mounted pivotally on a common pivot situation at the median plane of the wheel rim, whereas in a centre-pull brake the two callipers are mounted pivotally on distinct pivots, situated on either side of the median plane of the wheel rim, and usually parallel to this plane.

In drum brakes, incorporated in the wheel hub, the drag on the shoe from the rotation of the wheel can be used to supplement the brake applying force and drum brakes based on this principle work effectively. By contrast centre-pull or side-pull brakes in which the brakes act on the rim of the wheel do not have this feature of being "self-applying" and are therefore not so powerful. It follows from this that, in order to obtain effective braking, the cyclist must exert a much greater force on the brake lever, since this force must not only provide the total brake-applying force but must also compensate for losses resulting from the poor force transmision of a Bowden cable.

Different solutions have already been conceived with the aim of increasing the braking force on the rim. Certain of these solutions consist in mechanisms which decrease the force needed, but increase the distance moved by the brake lever, which constitutes a disadvantage. There are also in existence some so-called "self-applying" brakes, in which the drag from the rotation of the wheel causes an increase in braking force by the intermediary of a wedge, but these brakes do not prove to be very effective.

The present invention aims to remedy these drawbacks and to provide a centre-pull brake permitting a perceptible increase in braking force on the rim.

According to the present invention we provide a vehicle having a frame; a wheel; and centre-pull calliper wheel brake comprising two callipers, and means mounting the callipers relative to the frame for pivotal movement about axes which are inclined with respect to the median plane of the wheel rim and intersect at a point situated in said median plane, wherein said two axes diverge with respect to each other along the direction of the forward movement of the wheel rim relative to the frame during rotation of said wheel.

The inclined position of the axes leads to augmentation of the tangential braking force on the wheel rim, a force which increases as the angle of inclination is increased. For the improvement of the effectiveness to be readily perceptible, the angle of inclination of the axes with respect to the plane of the rim should be at least 30°, and preferably close to 40° for which value calculations, confirmed by tests carried out, have shown a doubling of the braking force, in the case of a dry rim, for a given brake-applying force exerted on the callipers by the rider.

By its general structure and aesthetic appearance the brake according to this invention appears similar to conventional centre-pull calliper brakes, does not entail any mechanical complication, and has a construction which does not present any special difficulties. Furthermore, the very principle of a centre-pull brake is that the movement of the callipers are simultaneous and symmetrical, with the result that the callipers move by the same amount and never collide during normal use of the brake. Despite the inclination of the axes, the rotation of the callipers is sufficiently limited so that the brakes remain noticeably parallel to the rim without it being necessary to incorporate any special compensation. Retraction of the callipers can be effected by a single spring connecting the ends of the callipers. This does away with the customary auxiliary tractive cable used in centre-pull brakes, which is awkward and causes breakdowns.

The front brake may be different from the rear brake for the same bicycle, given that the direction of convergence of the axes, with respect to the forward movement of the wheel rim, is the same whereas the brakes are fixed on opposite sides of their respective forks, the front brake being fixed in front of its corresponding fork and the rear brake being situated behind its corresponding fork.

By an optimal choice of the angle of inclination of the axes, the invention affords an appreciable increase of braking force without being dangerous, thereby allowing more speedy downhill travel, giving more confidence to the cyclist, and avoiding fatigue of the hand since the force necessary at the brake lever is much less for the same braking force and thus compensates for the poor force transmission especially in the case of a cable-operated back brake. This invention enables bicycle brakes of children's cycles to be particularly safe since children often lack sufficient strength to be able to use ordinary brakes satisfactorily.

In order that the present invention may be better understood, the following description is given, with reference to the accompanying drawings which show, by way of non-limiting examples, two embodiments of the centre-pull brake according to the invention. In the drawings:

FIG. 3 is a side elevation of the brake of FIG. 1;

FIG. 4 is a section taken along the lines 4—4 of FIG. 1;

FIG. 5 is a top plan view of a front wheel brake in accordance with the invention.

Figure 1:
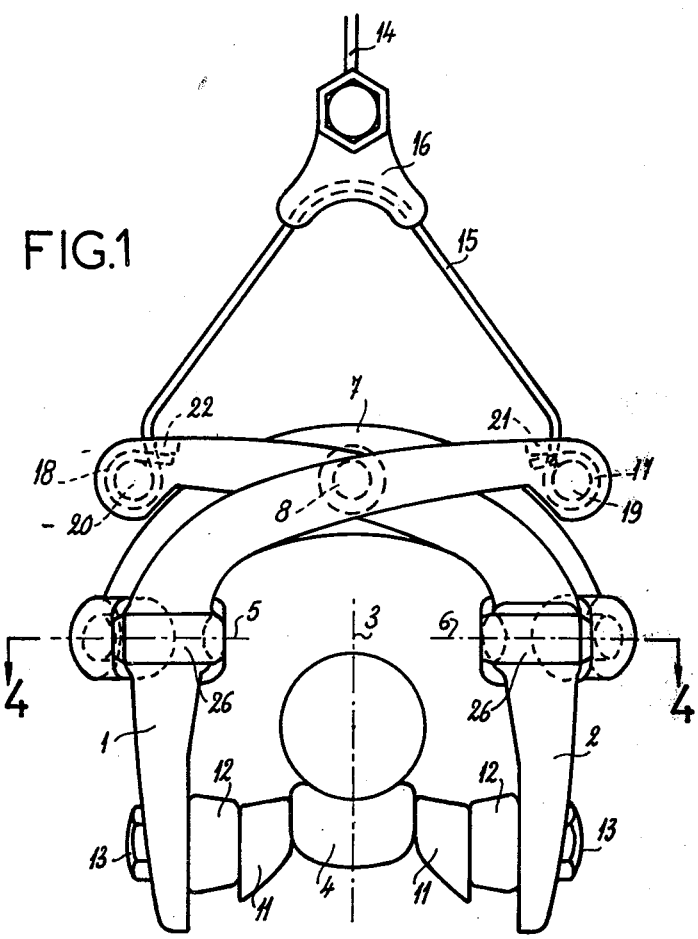
FIG. 1 is a front view of a rearwheel brake in accordance with the invention.

The centre-pull brake represented in FIG. 1 includes, in the usual manner, two callipers 1 and 2 which cross each other and which are arranged symmetrically with respect to the median plane 3 of the rim 4. The two callipers 1 and 2 constitute levers articulated around their respective axes 5 and 6, on a crescent-shaped cross-piece referred to herein as a bridge. As FIGS. 2 and 3 indicate, the bridge 7 is fixed by means of a screw 8 and a nut 9 on the cross-piece 10 which connects the two seat stays of the rear fork of the bicycle.

Each of the callipers 1 and 2 is provided, in its lower part, with a brake block 11 situated adjacent the rim 4 and carried by means of a brake shoe 12, fixed to the calliper by means of a nut 13 (FIG. 3).

The centre-pull brake cable 14 is connected to the two callipers 1 and 2 by means of a spring 15 which also serves as a retractor. The spring 15 has the general shape of an inverted V and its central part is connected to the brake cable 14 by a cable anchor 16, whereas the ends 17 and 18 of the spring 15 are in the form of helicoidal springs wound around pins 19 and 20, formed at the upper ends of callipers 1 and 2. The two ends of the spring 15 bear on abutments 21 and 22 of the callipers 1 and 2.

As shown in FIG. 4, the axes 5 and 6 of the two callipers 1 and 2 are inclined at an angle $\alpha$ with respect to the median plane 3 of the rim 4 and converge at a point 0 situated in this plane. They diverge with respect to each other in the direction of the forward movement of the rim, indicated by an arrow 23. In the examples shown, the value of angle $\alpha$ is substantially 40°.

FIG. 4 also shows the particular profile of the ends of the bridge 7 and the central part of each of the callipers 1 and 2 at the pivots. In this example, the setting up of the callipers is in accordance with French Pat. application No. 75.22632 filed 11th July 1975 in the name Rene Lauzier. Accordingly, the two callipers 1 and 2 pivot about screws 24 and 25 which are coaxial with the axes 5 and 6, and fixed to the bridge 7. These pivots, whose size is limited, do not need either nuts or washers for the assembly of the callipers. To give a pleasing overall appearance, small plates 26 which form screens are arranged to close the outlet of the threaded hole of each calliper.

FIG. 5 shows a front wheel brake in accordance with the invention, in which the elements corresponding to those previously described are indicated by the same reference numerals.

Figure 2:
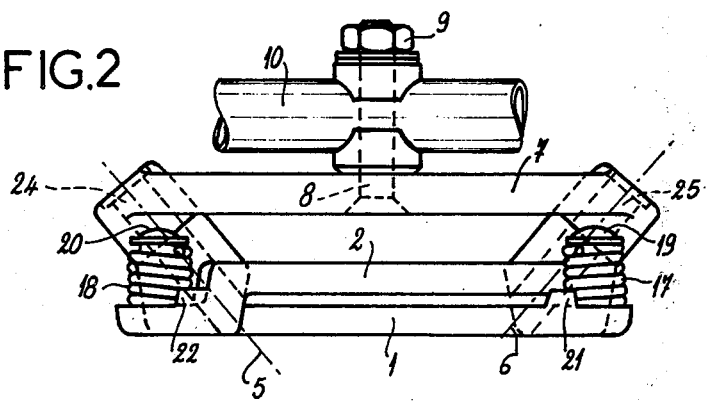
FIG. 2 is a top plan view of the brake of FIG. 1.

Contrary to the embodiment shown in FIG. 2, the callipers 1 and 2 and the bridge 7 are modified since the bridge is here fixed on the head of the front fork 27 which is behind the brake, whereas in the case of the rear wheel brake the cross-piece 10 to which the brake is fixed is situated in front of the brake.

Figure 6:
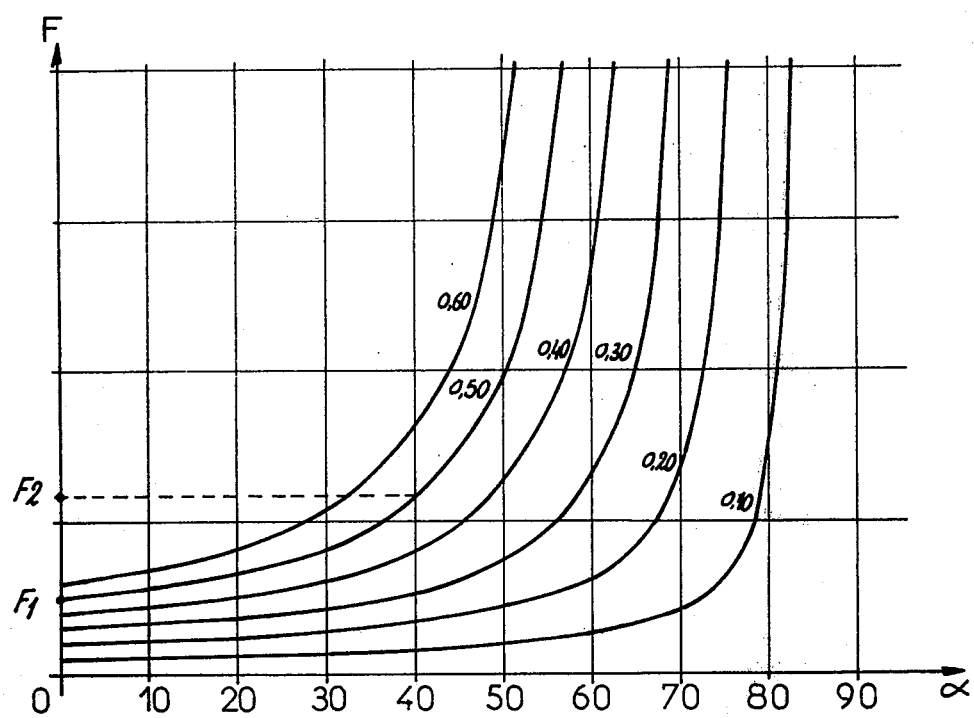
FIG. 6 is a diagram showing the curves of the braking force as a function of the angle of inclination of the axes of the callipers with respect to the median plane of the wheel rim, for different values of the coefficient of friction.

The curves drawn in FIG. 6 are representative of the tangential braking force F on the wheel rim 4 as a function of the angle of inclination $\alpha$ (expressed in degrees) of the brake calliper axes 5 and 6 with respect to the median plane 3 of the rim. Six curves are drawn, corresponding to friction coefficients of the brake on the rim equal to: 0.10, 0.20, 0.30, 0.40, 0.50 and 0.60. All the curves rise as a function of angle $\alpha$, their ordinate for an angle $\alpha$ equals zero representing the braking force F obtained with an ordinary centre-pull brake whose axes are parallel to the median plane of the rim.

With reference to these curves, determined by calculation and verified by tests, various characteristics may be observed:

The slope of all the curves remains slight for the angles $\alpha$ between 0° and 20°. An appreciable increase in braking force F is therefore not achieved if only a small angle of inclination is chosen. The braking force obtained becomes really appreciable upwards of an inclination $\alpha$ of about 30°.

One can also observe that the force obtained, for a particular value of angle $\alpha$ near the middle of the available range, will be greater the higher the coefficient of friction becomes. The improvement obtained is slight when the friction coefficient is low, which is the case when braking on a wet rim. Whatever the causes, there will nevertheless be, in this case, a result which can only be worse when the angle of inclination $\alpha$ is 0. Elsewhere, in the case of a very large angle of inclination $\alpha$, the different curves deviate very strongly from each other and there is a risk of the braking effect being too sensitive to the variations of the friction coefficient, so that the brake may be dangerous; in practice the cyclist has a tendency to squeeze the brake lever harder to brake with a wet rim and as the rim dries, as a result of the friction heating of the brake block the braking suddenly becomes very fierce.

An angle $\alpha$ close to 40° avoids at the same time the drawbacks of too shallow inclination angles and too steep inclination angles. As FIG. 6 shows, in the case of a dry rim corresponding to a friction coefficient of 0.50, a braking force $F_2$ is achieved which is equal to twice the force $F_1$ provided by an ordinary centre-pull brake.

The callipers of front wheel and rear wheel brakes described above are pivoted on a bridge mounted on the frame of the bicycle, but it is quite clear that the invention also applies to cantilever brakes in which the callipers may be articulated directly on the front or rear fork itself. In short, the invention concerns not only cycle brakes, but also brakes for similar two-wheeled vehicles such as mopeds.

I claim:

1. A vehicle having a frame; a wheel; and centre-pull calliper wheel brake comprising two callipers, and means mounting the callipers relative to the frame for pivotal movement about respective axes which are inclined with respect to the median plane of the wheel rim and intersect at a point situated in said median plane, wherein said two axes diverge with respect to one another along the direction of the forward movement of the wheel rim relative to the frame during rotation of said wheel.

2. A vehicle according to claim 1, wherein the angle of inclination of the pivotal axes of the callipers with respect to said median plane of the wheel rim is at least 30°.

3. A vehicle according to claim 2, wherein the angle of inclination of the pivotal axes of the callipers with respect to said median plane of the wheel rim is substantially 40°.

* * * * *

REEXAMINATION CERTIFICATE (1230th)
United States Patent [19]
Lauzier

[11] B1 4,163,482
[45] Certificate Issued  Apr. 3, 1990

[54] CENTER-PULL CALLIPER BRAKES FOR BICYCLES AND THE LIKE

[75] Inventor: René Lauzier, Ruy, France

[73] Assignee: Angenieux CLB S.A., Loire, France

Reexamination Request:
No. 90/001,723, Feb. 28, 1989

Reexamination Certificate for:
Patent No.: 4,163,482
Issued: Aug. 7, 1979
Appl. No.: 882,053
Filed: Feb. 28, 1978

[30] Foreign Application Priority Data
Mar. 14, 1977 [FR] France .................. 77 08322

[51] Int. Cl.⁴ ............................................. B62L 1/06
[52] U.S. Cl. .................. 188/24.11; 188/72.2
[58] Field of Search .......... 188/24.12, 24.14, 24.21, 188/72.2

[56]  References Cited
U.S. PATENT DOCUMENTS
3,114,434  12/1963  Pletscher ............ 188/24.14

Primary Examiner—Duane A. Reger

[57]  ABSTRACT

The invention provides a center-pull calliper brake for a bicycle or the like in which the callipers are hinged about respective axes which are inclined with respect to the median plane of the wheel rim in such a way as to diverge when considered along the direction of movement of the wheel during forward travel of the vehicle. This gives a self-applying braking effect which considerably increases the safety of the bicycle.

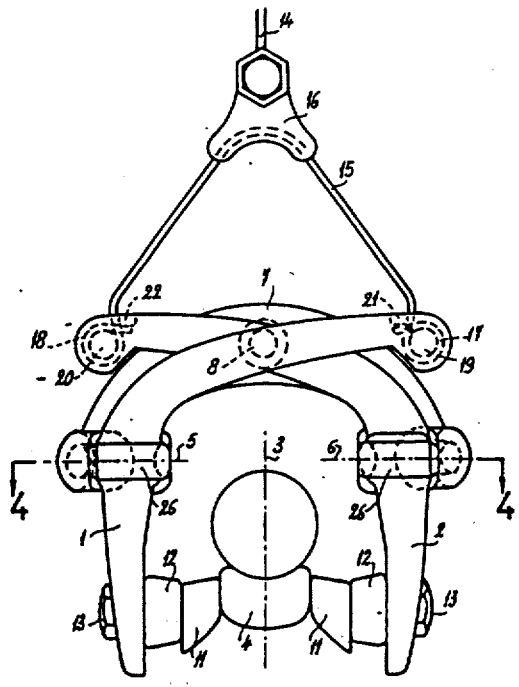

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

Claims 1, 2 and 3 are cancelled.

* * * * *